United States Patent [19]

Sommer

[11] Patent Number: 5,213,437
[45] Date of Patent: May 25, 1993

[54] SERRATED-SHAFT CONNECTION

[75] Inventor: Rudolf Sommer, Schwäbisch Gmünd, Fed. Rep. of Germany

[73] Assignee: Zahnradfabrik Friedrichshafen, AG, Friedrichshafen, Fed. Rep. of Germany

[21] Appl. No.: 678,366

[22] PCT Filed: Dec. 5, 1989

[86] PCT No.: PCT/EP89/01484
§ 371 Date: Apr. 26, 1991
§ 102(e) Date: Apr. 26, 1991

[87] PCT Pub. No.: WO90/06450
PCT Pub. Date: Jun. 14, 1990

[30] Foreign Application Priority Data

Dec. 10, 1988 [DE] Fed. Rep. of Germany ....... 3841703

[51] Int. Cl.⁵ .............................................. B25G 3/28
[52] U.S. Cl. ...................................... 403/359; 403/298
[58] Field of Search ................................ 403/359, 298

[56] References Cited

U.S. PATENT DOCUMENTS

| | | |
|---|---|---|
| 1,779,805 | 10/1930 | Dunwoodie .................. 403/359 |
| 3,836,272 | 9/1974 | Duer ................................ 403/359 |
| 4,098,096 | 7/1978 | Chard et al. ................. 403/359 X |
| 4,681,307 | 7/1987 | Leonard ..................... 403/359 X |
| 4,838,832 | 6/1989 | Schmitt et al. ............. 403/359 X |

FOREIGN PATENT DOCUMENTS 771366 10/1980 U.S.S.R. ........................... 403/359

*Primary Examiner*—Andrew V. Kundrat
*Attorney, Agent, or Firm*—Albert M. Zalkind

[57] ABSTRACT

A serrated-shaft connection between a shaft (1) and a hub (4) has a large number of teeth (2, 5) that are located on the outer circumferential surface of the shaft (1) and the inner circumferential surface of the hub (4), respectively. The profiles (6) of the teeth (5) of the hub (4) are bent convexly in cross section. In such a connection, it is essential that the profiles (3, 6) of the teeth (2, 5) of the shaft (1) and the hub (4) should be bent differently in such a way that the profiles (3) of the teeth (2) of the shaft (1) will have distances above the top of the teeth that are different from those above the top of the teeth (5) of the hub (4). As a result, the tooth profiles of the shaft and the hub can mesh with each other during assembly so that a compressive connection that fits with great precision is obtained.

7 Claims, 1 Drawing Sheet

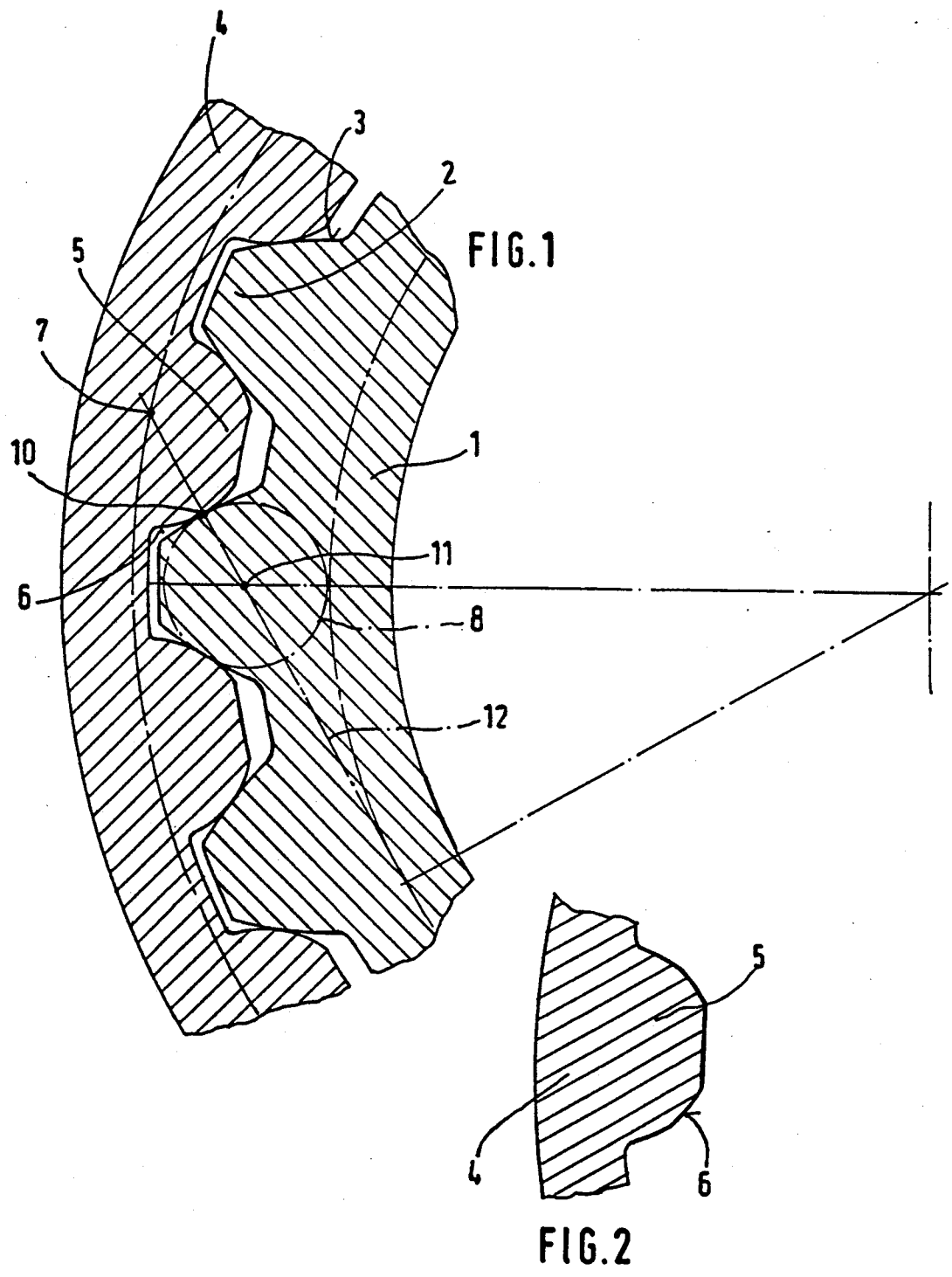

5,213,437

SERRATED-SHAFT CONNECTION

BACKGROUND OF THE INVENTION

The invention is concerned with a serrated-shaft connection between a shaft and a hub with a large number of teeth that are located on the outer circumference of the shaft and on the inner circumference of the hub.

BRIEF DESCRIPTION OF THE PRIOR ART

In known toothed-shaft connections of this kind, the tooth profiles of the teeth of the shaft and the hub are made so that they are always equidistant or nearly equidistant from each other in the meshing zone. In such devices, the tooth profiles or edges are made in straight lines or are involuted in cross section, for example.

If such a known serrated-shaft connection is used in a compressive connection, no uniform compression can be achieved because of the usual toothing deviations. Instead, play or compression that is too high appears in the tolerance limit areas. If there is too much play between the teeth of the shaft and the hub, "frictional corrosion" forms and the connection works loose. If there is too little play—that is, if the compression is too great—the hub becomes locally overelongated. This results in difficulties, for example, when the serrated-shaft connection is used for fastening a detent to a shaft of a vehicle's gear box, because the connection is too loose or the detent's exterior toothing is stretched. Depending upon its cross section, the exterior toothing of the detent also goes partially out of round, which makes assembly and operation of the transmission much harder.

SUMMARY OF THE INVENTION

The object of the invention is to improve the precision of the synchronization of a known serrated-shaft connection without reducing its manufacturing tolerance.

That object is achieved by having the profiles or edges of the shaft teeth and the hub teeth bent differently in such a way that the profiles of the shaft teeth have distances above the top of the teeth that are different from those above the top of the hub teeth.

Owing to the construction of the tooth profiles according to the invention, the compression of the sides can be favorably influenced by selecting an appropriate size and method of securing the bent tooth flank in place and by selecting appropriate materials. Thus, discrepencies of tooth flank shape can be harmlessly compensated and deviations of tooth flank direction and spacing can be compensated for since the defective places resulting from overstraining of material can yield. As a result, the tooth profiles of the shaft and the hub can fit each other. The space between the teeth in the bottom of the hub becomes wider than before without modification of the profile. As a result, improper meshing with the shaft is prevented, and the serrated-shaft connection can be constructed more easily.

If a shaft with conventional toothing is used—with involuted profile, for example—it is advantageous if the tooth profiles of the hub's teeth are bent convexly in cross section. In this case, two convexly bent tooth profiles that can fit each other always meet each other.

The shape of the bent portion of the tooth profiles can be very simply produced geometrically as a section of an arc.

The midpoint of the bent portion of the tooth profiles of the hub teeth lies on the normal line that runs through the point of contact between the tooth profiles of the shaft and the hub. If a measuring device is used for indirect checking of the hub teeth's thickness and the measuring device is made of such a size that its midpoint also lies on the normal line, a precise equalization of the thickness of the hub teeth with the thickness of the shaft teeth is possible because the point of contact between the measuring device and the hub tooth profile coincides with the point of contact between the shaft tooth profile and hub tooth profile.

BRIEF DESCRIPTION OF THE DRAWING

The invention will now be explained in greater detail with the help of an embodiment that is represented in the accompanying drawing, in which;

FIG. 1 shows a partial cross section through the serrated-shaft connection according to the invention; and FIG. 2 shows a variation of the bent portion of the tooth profile of FIG. 1.

DETAILED DESCRIPTION

A shaft 1 carries teeth 2 on its outer circumferential surface whose flanks or sides 3 have the shape of an involute, for example.

A hub 4 has teeth 5 on its inner circumferential surface. The profiles 6 of the teeth 5 of the hub 4 have a convexly bent shape in cross section. If the hub's toothing is produced by broaching, sintering or another shaping process, for example, it is advantageous if the bent portion of the tooth profiles 6 is either a section of an arc or has at least one point of discontinuity. Thus, the convex bent portion has a break at least one point, as is shown in FIG. 2. If the toothing of the hub 4 is produced by a rotary-furnace process, on the other hand, it is sufficient (in accordance with rolling kinematics) for the bent portion of the tooth profiles 6 to be approximately a section of an arc. The arc-shaped section of the tooth profile 6 has a midpoint 7.

For measuring the toothing of the serrated-shaft connection, a measuring device 8 with a circular cross section can be used. Such a measuring device can be a ball or a potentiometer wire, for example.

It is advantageous if the midpoint 7 of the arc-shaped bent tooth profile 6, a point of contact 10 between a tooth 2 of the shaft 1 and a tooth 5 of the hub 4, and the midpoint 11 of the measuring piece 8 lie on a straight normal line 12. As a result, the thickness of the teeth 5 of the hub 4 can be exactly equal to that of the teeth 2 of the shaft 1. It is advantageous for the point of contact 10 to be located in the radial middle of the profile section.

In assembling the serrated-shaft connection, any excess material present on the teeth 2, 5 at the points of contact is flattened so that a compressive connection that fits with great precision is obtained.

In the case of hubs having dissimilar cross sections, the shapes and/or the bent portions of the profiles 6 of the individual teeth can be varied to prevent nonuniform overelongation of the hub 4.

I claim:

1. In a serrated-shaft connection between a shaft (1) having a large number of teeth (2) on an outer circumferential surface thereof and a hub (4) having a large number of teeth located on an inner circumferential surface thereof, each tooth having a profile defined by side and top edges, the improvement which comprises the curvature of the profile on the side edges of the shaft teeth differs from the curvature of the profile of the side edges of the hub teeth to define first gaps between the tops of the shaft teeth and the hub and second gaps between the tops of the hub teeth and the shaft, the first and second gaps being different to provide a precise interference fit between the hub and shaft teeth profiles.

2. A serrated-shaft connection as defined in claim 1, wherein the side edge said hub teeth profiles are bent convexly in cross-section.

3. A serrated-shaft connected as defined in claim 2, wherein the vent portion of said hub teeth profiles is a section of an arc.

4. A serrated-shaft connected as defined in claim 2, wherein the vent portion of said hub teeth profiles has at least one point of discontinuity.

5. A serrated-shaft connected as defined in claim 2, wherein the vent portion of said hub teeth profiles have variable shapes.

6. A serrated-shaft connected as defined in claim 4, wherein the vent portion of said hub teeth profiles have variable shapes.

7. In a serrated-shaft connection between a shaft (1) having a large number of teeth (2) on an outer circumferential surface thereof and a hub (4) having a large number of teeth located on an inner circumferential surface thereof, each tooth having a profile defined by side and top edges, the improvement which comprises the curvature of the profile on the side edges of the shaft teeth differs from the curvature of the profile of the side edges of the hub teeth to define a variable space between adjoining hub and shaft teeth along the side edges thereof, the side edges of said hub teeth profiles being bent convexly in cross-section in a section of an arc with a midpoint (7) and a point of contact (10) being defined between adjacent hub and shaft teeth, a line passing through said midpoint and said point of contact also passing through a center (11) of a measuring device (8) having a circular cross-section used for measuring the toothing of the serrated-shaft connection.

* * * * *